US009002990B1

(12) United States Patent
Anand et al.

(10) Patent No.: US 9,002,990 B1
(45) Date of Patent: Apr. 7, 2015

(54) FAST CACHE PURGE IN CONTENT DELIVERY NETWORK

(71) Applicant: Instart Logic, Inc., Mountain View, CA (US)

(72) Inventors: Ashok Anand, Bangalore (IN); Manjunath Bharadwaj Subramanya, Bangalore (IN)

(73) Assignee: Instart Logic, Inc., Palo Alto, CA (US)

( * ) Notice: Subject to any disclaimer, the term of this patent is extended or adjusted under 35 U.S.C. 154(b) by 0 days.

(21) Appl. No.: 14/206,458

(22) Filed: Mar. 12, 2014

(51) Int. Cl.
*G06F 15/16* (2006.01)
*H04L 29/08* (2006.01)

(52) U.S. Cl.
CPC .................................. *H04L 67/2852* (2013.01)

(58) Field of Classification Search
CPC .................................................... H04L 41/509
See application file for complete search history.

(56) References Cited

U.S. PATENT DOCUMENTS

| 3,916,113 | A  | * | 10/1975 | Heck et al. ........... 340/2.21 |
| 5,559,988 | A  | * | 9/1996 | Durante et al. ........... 711/152 |
| 6,345,352 | B1 | * | 2/2002 | James et al. ........... 711/210 |
| 6,502,125 | B1 | * | 12/2002 | Kenner et al. ........... 709/203 |
| 6,754,782 | B2 | * | 6/2004 | Arimilli et al. ........... 711/144 |
| 7,111,057 | B1 | * | 9/2006 | Sherman et al. ........... 709/223 |
| 8,117,276 | B1 | * | 2/2012 | Sakata et al. ........... 709/214 |
| 8,266,305 | B2 | * | 9/2012 | Sherman et al. ........... 709/229 |
| 2002/0087765 | A1 | * | 7/2002 | Kumar et al. ........... 710/107 |

* cited by examiner

*Primary Examiner* — Lance L Barry
(74) *Attorney, Agent, or Firm* — Van Pelt, Yi & James LLP

(57) ABSTRACT

Processing a purge request is disclosed. The purge request is received. An availability state for each content distribution node in a group of content distribution nodes is tracked. Based on the purge request, one or more purge instructions are generated for one or more available state content distribution nodes of the group. Based on the purge request, one or more queued purge instructions are queued for one or more unavailable state content distribution nodes of the group. It is determined that the one or more available state content distribution nodes of the group have completed processing the one or more purge instructions generated for the one or more available state content distribution nodes. Based at least in part on the queuing of the one or more queued purge instructions for the one or more unavailable state nodes, an indication that the purge request has been completed is authorized.

40 Claims, 6 Drawing Sheets

FAST CACHE PURGE IN CONTENT DELIVERY NETWORK

BACKGROUND OF THE INVENTION

Traditionally purging (e.g., removing or modifying) stored content served by a content delivery network (CDN) can often take up to 24 hours. In order to confirm that an indicated content has been purged across the entire CDN, a purge request must be propagated out to the entire CDN network and a confirmation of completion of the purge request (e.g., confirmation that the indicated content of the purge request has been removed from the local storage/cache of the node) must be received from every content delivery node of the CDN. In CDNs with a large number of nodes, it is likely that some of the nodes are temporarily unreachable for a few seconds to a few hours at various different times due to maintenance, upgrades, and/or errors. If a node is unavailable, the desired content purge cannot be completed and confirmed until the node becomes available again to process the purge request. Often other processes and services cannot proceed until a confirmation of the desired content purge is received. Therefore, there exists a need to reduce the amount of time required to confirm a purge of desired content.

BRIEF DESCRIPTION OF THE DRAWINGS

Various embodiments of the invention are disclosed in the following detailed description and the accompanying drawings.

DETAILED DESCRIPTION

Figure 1:
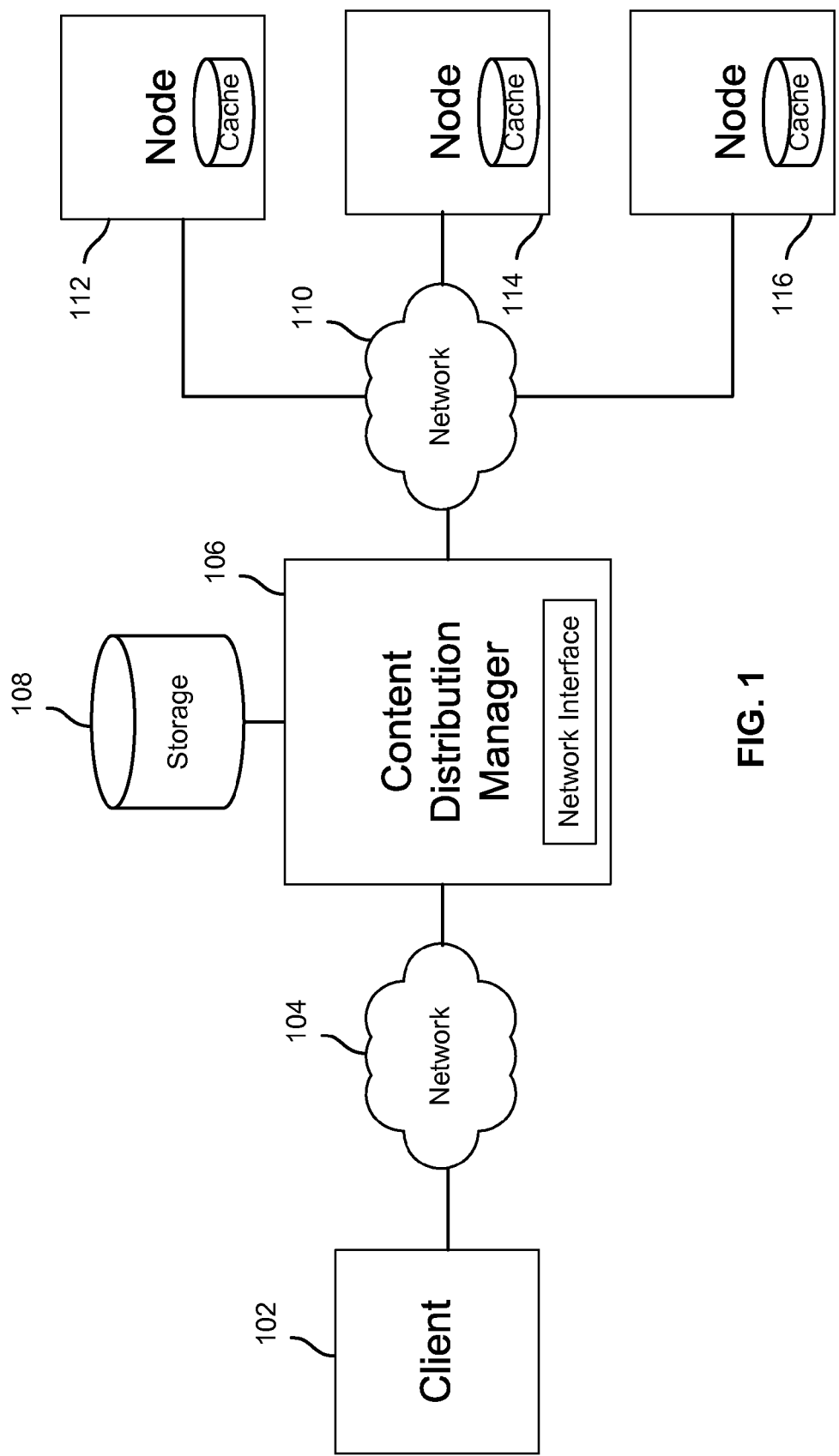
FIG. 1 is a block diagram illustrating an embodiment of a content distribution network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content distribution network manager is disclosed. In some embodiments, a purge request is received from a client. For example, a request to remove and/or update an indicated content being provided via a content distribution network is received from a content provider that initially provided the indicated content to be served to users by the content distribution network. One or more purge instructions are generated for one or more available content distribution nodes of a content distribution network. For example, an instruction to purge an indicated content is provided to content distribution nodes that are online and available to receive the instruction. In some embodiments, it is determined that the one or more available content distribution nodes have completed processing the one or more generated purge instructions. One or more purge instructions are queued for one or more unavailable content distribution nodes of the content distribution network. For example, the purge instruction is placed in each purge instruction queue associated with each unavailable offline node to allow the unavailable node to process the queued purge instruction when the unavailable node becomes available. An indication is authorized to provide that the purge request has been completed based on the queued instruction(s) for the one or more unavailable nodes. For example, it is indicated that the purge request has been completed even though the unavailable nodes have not processed purge instruction in their queues because the unavailable nodes will process the queued purge instructions before the unavailable nodes can become available to serve content.

FIG. 1 is a block diagram illustrating an embodiment of a content distribution network environment. Client 102 communicates with content distribution manager 106 via network 104. In some embodiments, client 102 provides a request to purge a specified content being served/distributed by a content distribution network. For example, client 102 sends an instruction using an Application Programming Interface (API) of manager 106, and the instruction specifies a content to be purged (e.g., specified content to be removed and/or replaced from the content distribution network). Examples of client 102 include a server, a system, a device, and any other computer able to instruct content distribution manager 106. Client 102 may be a part of an origin server that initially provided the indicated content to be purged to the content distribution network. Content distribution manager 106 manages purging of the specified content served by a content distribution network. The content distribution network includes one or more distributed systems that provide content to one or more users via a network. For example, the content distribution network includes one or more nodes and systems of a CDN. In the example shown, nodes 112, 114, and 116 are included in a content distribution network. Nodes 112, 114, and 116 may be edge nodes of a CDN or load balanced servers of a server farm. Nodes 112, 114, and 116 may be content distribution nodes that are each able to distribute mirrored content from its local storage/cache. For example, nodes 112, 114, and 116 are each located in different geographical locations and provide the same content to users near the geographical location of each node to minimize delay associated with providing content from servers located geographically far away. Nodes 112, 114, and 116 may be each associated with a local cache/storage where content to be served/provided by the node is stored. Each local cache/storage may be included in each node or connected to each node via a networked or direct connection.

Content distribution manager 106 communicates with nodes 112, 114, and 116 via network 110. Network 104 and network 110 may be the same network or different networks. For example, network 110 and network 104 are both the Internet. In another example, network 104 is the Internet and network 110 is a local area network. Content distribution manager 106 may include one or more devices and servers. Content distribution manager 106 maintains an availability status (e.g., whether a node is online, offline, or in a transitional state) of each node of the content distribution network managed by content distribution manager 106. The status may be updated by manager 106 and/or directly by a node. The status may be stored in storage 108. Examples of storage 108 include a database, a table, a hash table, a list, a memory, and any other data structure or device configured to store data. Storage 108 may be connected to manager 106 directly, via network 104 and/or network 110. Content distribution manager 106 maintains a separate purge instruction queue for each node of the content distribution network maintained by manager 106. The queue includes purge instructions ready to be provided to an associated node when the node is ready to receive the instruction. For example, if a node is unavailable, the queue stores queued purge instructions ready to be provided to the node when the node becomes available again. The queue for each node may be stored in storage 108 and/or another storage/data structure of manager 106. For each received purge request, manager 106 adds in each purge instruction queue of the content distribution nodes of the content distribution network to be purged, a corresponding instruction to purge the specified content of the purge request from the cache/storage of each node.

One or more of the following may be included in networks 104 and 110: a direct or indirect physical communication connection, mobile communication network, Internet, intranet, Local Area Network, Wide Area Network, Storage Area Network, a wireless network, a cellular network, and any other form of connecting two or more systems, communication devices, components, or storage devices together. Although example instances of components have been shown to simplify the diagram, additional instances of any of the components shown in FIG. 1 may exist. Any of the components shown in FIG. 1 may be physically integrated in a single hardware component or may represent a plurality of hardware components. Components not shown in FIG. 1 may also exist. Manager 106 and/or storage 108 may be one of a plurality of replicated/redundant systems and/or devices.

Figure 2:
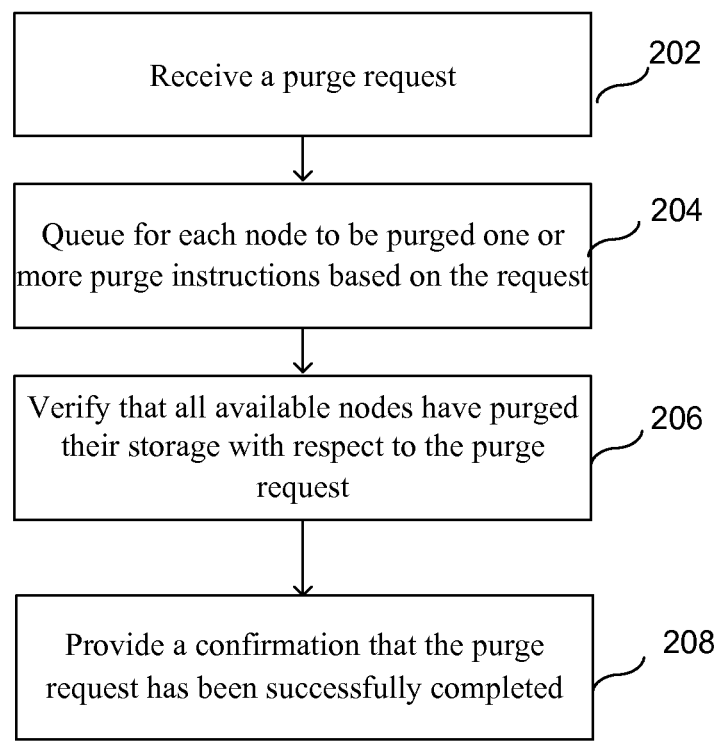
FIG. 2 is a flowchart illustrating an embodiment of a process for processing a purge request.

FIG. 2 is a flowchart illustrating an embodiment of a process for processing a purge request. The process of FIG. 2 may be at least in part implemented on content distribution manager 106 of FIG. 1.

At 202, a purge request is received. The purge request may specify that content is to be removed and/or updated from cache/storage of content distribution nodes of a content distribution network. The content distribution network may include one or more nodes that mirror content and provide content to various users that may be able to obtain content faster from one content distribution node over another node. In some embodiments, the purge request is received from a content provider such as an origin server that provides content to be served/distributed by a content distribution network (e.g., CDN). For example, the purge request is received from client 102 at content distribution manager 106 of FIG. 1. In some embodiments, the purge request is received from a user that accesses a receiver of the purge request via an interface provided by the receiver. For example, content distribution manager 106 of FIG. 1 provides a web interface to allow an authorized user to provide the purge request. In some embodiments, the purge request has been provided using an API of the receiver of the purge request. The purge request may identify the content (e.g., content location address) to be purged. For example, the purge request identifies one or more uniform resource identifiers (URIs) and/or uniform resource locators (URLs) of the content to be purged. The purge request may be encrypted.

In some embodiments, the received purge request is verified. For example, verification is performed to determine whether a requestor of the purge request is authorized to provide a request to purge an identified content of the purge request. If the purge request is determined as unauthorized, the process may end and an error message may be sent to the requestor.

At 204, one or more purge instructions based on the request are queued for each node to be purged. In some embodiments, the nodes to be purged include all member content distribution nodes (e.g., edge nodes) of a content distribution network. In some embodiments, the nodes to be purged may be identified in a listing stored by a content distribution manager such as manager 106 of FIG. 1. The list of nodes to be purged (e.g., list of content distribution nodes of a content distribution network) may be dynamically generated and/or statically configured. The list may also be updated (e.g., automatically updated, dynamically determined, and/or manually configured) as nodes of a content distribution network are removed and/or added. In some embodiments, a content distribution manager may mange a plurality of content distribution networks, the content distribution network associated with the request is determined, and the nodes of the determined distribution network are selected as the nodes to be purged.

In some embodiments, each node to be purged is associated with a separate queue that may include one or more queued purge instructions. The purge instruction based on the purge request instructs a node to purge (e.g., remove or update) a specified content of the purge request from a storage of the node. The queues of the nodes of a content distribution network are stored and/or managed by a content distribution manager (e.g., manager 106 of FIG. 1). In some embodiments, the queues are managed using Advanced Message Queuing Protocol (AMQP). For example, RabbitMQ software is utilized to implement and manage the queues. The queue of each node managed by the content distribution manager may be configured as a first-in-first-out (FIFO) queue. For example, the oldest purge instruction entry is removed for processing before newer entries. In some embodiments, when a purge instruction is placed in the queue, the purge instruction is associated with a time value (e.g., timestamp).

The nodes to be purged may be in different availability states. For example, a node that is functioning normally and available to serve/distribute content to users is in an available state (e.g., online status), a node that is not available to serve/distribute content to users is in an unavailable state (e.g., offline status), and a previously unavailable node that is in the process of becoming available is in a transition state (e.g., ready-to-be-online status). The availability state of each node of a content distribution network may be tracked by the content distribution manager. For example, the content distribution manager detects and updates a listing (e.g., stored in storage 108 of FIG. 1) of the availability state of each node.

When a node of a content distribution network is available (e.g., online), it actively processes purge instructions stored in its queue. For example, each online node periodically checks whether any purge instructions are stored in its queue and requests purge instructions from its queue (e.g., in FIFO order) one by one for processing. When a node is not available (e.g., offline), the queue of the node stores queued purge instructions to allow the node to process the queued purge instructions when the node becomes available to process the instructions. A purge instruction implementing the received purge request is placed in each queue of content distribution nodes of a content distribution network to be purged. In an alternative embodiment, if a node is available, the purge instruction may be directly issued to the node without storing the purge instruction in a queue.

At 206, it is verified that all available nodes have purged their storage with respect to the purge request. In some embodiments, when a node successfully processes a provided purge instruction (e.g., clear specified content from local storage/cache of the node), the node provides a confirmation that the purge instruction has been successfully processed by the node. This confirmation may be received by the content distribution manager and the manager tracks whether the purge instructions of a specific purge request have been successfully completed (e.g., tracked using storage 108 of FIG. 1). In some embodiments, it is verified that all available nodes purged their storage with respect to the purge request if all nodes of a content distribution network that are indicated to be available (e.g., online) have provided a confirmation that a provided purge instruction corresponding to the purge request has been successfully completed.

At 208, a confirmation is provided that the purge request has been successfully completed. For example, a provider of the purge request is provided an indication that the indicated content to be purged in the request will effectively no longer be provided by a content distribution network. This confirmation may allow the receiver of the confirmation to implement a change, a process, a service, an update, and/or an upgrade that relies on the indicated content of the request to be no longer provided by the content distribution network. In some embodiments, the confirmation may be provided even though unavailable nodes (e.g., offline nodes) have not purged their individual cache/storage by processing the purge instructions corresponding to the purge request because each unavailable node is configured to process the purge instruction in its queue before the unavailable node becomes available. In some embodiments, the confirmation is only provided if the verification of 206 is made and it is verified that a purge instruction corresponding to the purge request has been successfully added to each queue of any nodes that are unavailable. In some embodiments, the confirmation is only provided if the verification of 206 is made, it is verified that all transitional nodes purged their storage with respect to the purge request (e.g., successfully completed the purge instruction corresponding to the purge request), and it is verified that a purge instruction corresponding to the purge request has been successfully added to each queue of any nodes that are unavailable.

Figure 3:
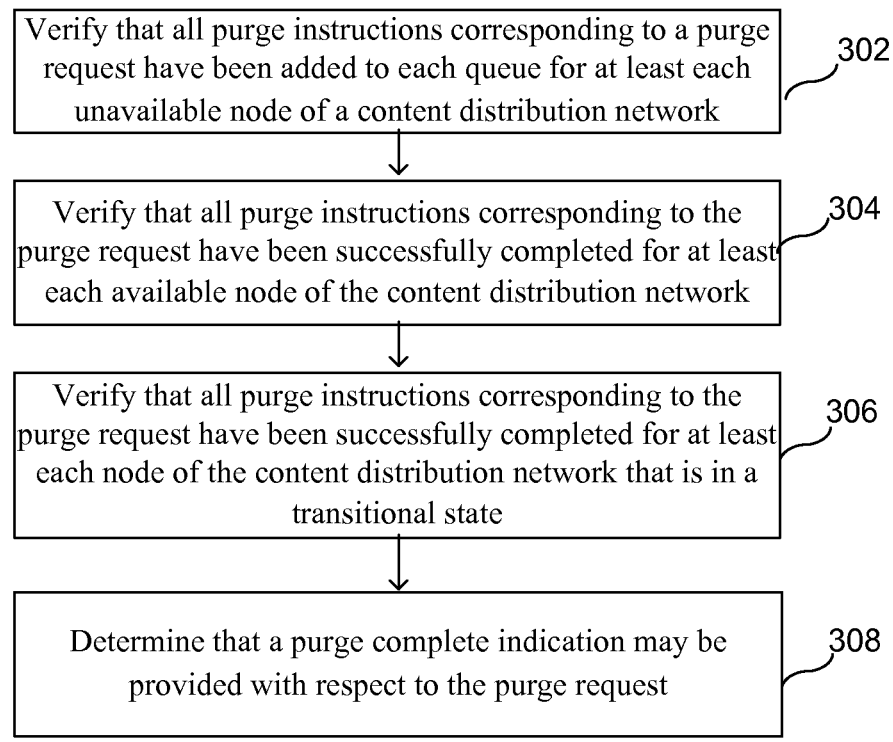
FIG. 3 is a flowchart illustrating an embodiment of a process for determining a status of a purge request.

FIG. 3 is a flowchart illustrating an embodiment of a process for determining a status of a purge request. The process of FIG. 3 may be at least in part implemented on content distribution manager 106 of FIG. 1. In some embodiments, at least a portion of the process of FIG. 3 is included in 206 and/or 208 of FIG. 2.

At 302, it is verified that all purge instructions corresponding to a purge request have been added to each queue for at least each unavailable node of a content distribution network. In some embodiments, the purge request is the purge request received in 202 of FIG. 2 and the queue is the queue utilized in 204 of FIG. 2. In some embodiments, a content distribution manager (e.g., manager 106 of FIG. 1) tracks an availability state (e.g., a node can be either in available, unavailable, or transitional state) of each content distribution node of the content distribution network. In some embodiments, for each tracked node that is known to be in an unavailable state (e.g., offline status and not available to serve content to requestors), it is verified that a purge instruction implementing the purge request has been added to the unavailable node's purge instruction queue. In some embodiments, for each purge request, statuses of the purge instructions corresponding to the purge request are tracked, and for each node that is identified to be in an unavailable state, the purge instruction status of the node identifies whether the purge instruction of the purge request has been added to the node's queue. When the purge instruction is added to a queue of a node, the purge instruction status of each node is updated to identify that the instruction has been added, and the verification of 302 may be performed by checking this purge instruction status of nodes that are indicated to be in an unavailable state. In some embodiments, the verification of 302 may be made as a confirmation that unavailable nodes have completed the purge instruction even though unavailable nodes have not purged their storage by processing the purge instructions in their queues because each node is configured to process required purge instructions before the unavailable node becomes available.

At 304, it is verified that all purge instructions corresponding to the purge request have been successfully completed for at least each available node of the content distribution network. In some embodiments, for each node of the content distribution network that is known to be in an available state (e.g., online and ready to serve/distribute cached content), it is verified that the purge instruction has been successfully processed and completed (e.g., content indicated by the instruction has been purged by the node). If the purge instruction has not been completed for an available node, the process waits until the purge instruction has been completed by the node before providing the verification in 304. In some embodiments, for each purge request, statuses of the purge instructions corresponding to the purge request are tracked, and for each node that is identified to be in an available state, the purge instruction status of the node identifies whether a confirmation has been received that the purge instruction of the purge request has been successfully completed by the node. For example, when a node obtains a purge instruction from its queue and successfully processes the purge instruction, the node provides a notification that the purge instruction has been completed to a content distribution manager that tracks the completion of purge instructions. When the purge instruction has been successfully completed by a node, the purge instruction status of the node for the particular purge request is updated to identify that the instruction has been completed, and the verification of 304 may be performed by checking the purge instruction status of nodes that are indicated to be in an available state.

At 306, it is verified that all purge instructions corresponding to the purge request have been successfully completed for at least each node of the content distribution network that is in a transitional state. In some embodiments, for each node of the content distribution network that is known to be in the transitional state (e.g., node is not currently serving/distributing stored content as an available node, but the node is preparing (e.g., processing purge instructions in its queue) to become an available node), it is verified that the purge instruction has been successfully completed. If the purge instruction has not been completed by a transitional node, the process waits until the purge instruction has been completed before providing the verification in 306. In some embodiments, for each purge request, statuses of the purge instructions corresponding to the purge request are tracked, and for each node that is identified to be in a transitional state, the purge instruction status of the node identifies whether a confirmation has been received that the purge instruction of the purge request has been successfully completed by the node. For example, when a node obtains a purge instruction from its queue and successfully processes the purge instruction, the node provides a notification that the purge instruction has been completed to a content distribution manager that tracks the completion of purge instructions. When the purge instruction has been successfully completed by a node, the purge instruction status of the node for the particular purge request is updated to identify that the instruction has been completed, and the verification of 306 may be performed by checking the purge instruction status of nodes that are indicated to be in a transitional state. In an alternative embodiment, step 306 is optional.

At 308 it is determined that a purge complete indication may be provided with respect to the purge request. In some embodiments, the determination of 308 is only made if the verifications have been successfully completed for steps 302, 304, and 306. In some embodiments, the determination of 308 is only made if the verifications have been successfully completed for at least steps 302 and 304. The determination in 308 may allow the confirmation to be provided in 208 of FIG. 2.

Figure 4:
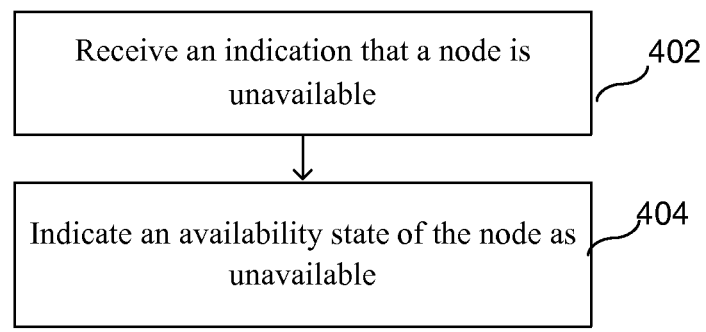
FIG. 4 is a flowchart illustrating an embodiment of a process for updating a status of a node as unavailable.

FIG. 4 is a flowchart illustrating an embodiment of a process for updating a status of a node as unavailable. The process of FIG. 4 may be at least in part implemented on content distribution manager 106 of FIG. 1.

At 402, an indication is received that a node is unavailable. The node may be unavailable because the node has encountered an error, is being upgraded, is being updated, is being maintained, etc. In some embodiments, the node is a content distribution node (e.g., edge node) of a content distribution network. An unavailable node may be not available to serve/distribute content. The indication may be received by a content distribution manager that tracks an availability state of the node. In some embodiments, the indication is received from the node. For example, the node provides a message that the node has encountered an error and/or will become unavailable (e.g., due to upgrade, update, etc.). In some embodiments, the indication is received if the node does not provide a message. For example, the node provides a heartbeat message periodically and the indication is received if the heartbeat message has not been received within a period amount of time. In another example, the content distribution manager periodically sends a status inquiry message to the node and the indication is received if the node does not respond to the status inquiry message.

At 404, an availability state of the node is indicated as unavailable. For example, a stored status indicator of the node is updated as "offline." In some embodiments, indicating the state includes modifying a data structure of a content distribution manager that tracks the availability state of nodes of a content distribution network. For example, a list entry corresponding to the node is updated to indicate that the node is unavailable. The state indicated in 404 may be used in 302 of FIG. 3 to at least in part determine whether the node is unavailable.

Figure 5:
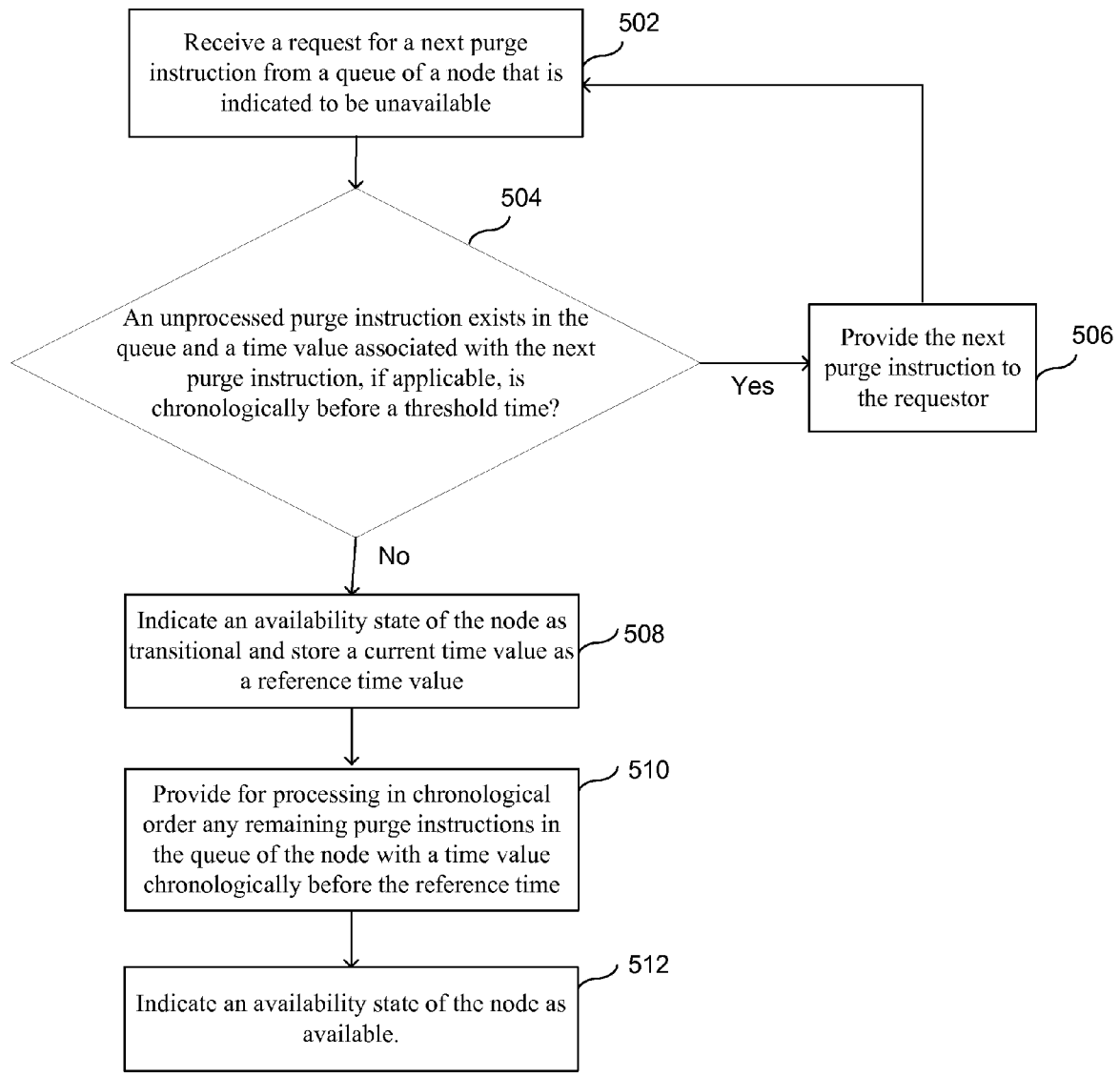
FIG. 5 is a flowchart illustrating an embodiment of a process for updating a status of a node as available.

FIG. 5 is a flowchart illustrating an embodiment of a process for updating a status of a node as available. The process of FIG. 5 may be at least in part implemented on content distribution manager 106 of FIG. 1.

At 502, a request for a next purge instruction from a queue of a node that is indicated to be unavailable is received. In some embodiments, the next purge instruction from the queue is the purge instruction added to the queue in 204 of FIG. 2. In some embodiments, the request is received from the node that is indicated to be in an unavailable state. For example, the node was previously indicated to be unavailable in 404 of FIG. 4, and the node has provided the request for the next purge instruction in order to process a backlog of one or more purge instructions in its queue in preparation to become available again to serve/distribute content as a part of a content distribution network.

At 504 it is determined whether an unprocessed purge instruction exists in the queue and whether a time value associated with the next purge instruction, if applicable, is chronologically before a threshold time. For example, it is determined whether any purge instruction is left in the queue of the node and if there exists an instruction in the queue, a purge instruction with the oldest timestamp (e.g., purge instruction in the queue is provided in FIFO order) is selected as the next purge instruction to be provided.

In some embodiments, determining whether the time value associated with the next purge instruction is chronologically before the threshold time includes determining whether a timestamp of the next purge instruction (e.g., timestamp indicates when the next purge instruction was added to the queue) is chronologically before the threshold time. In some embodiments, the threshold time is associated with a current time when the determination is made. For example, the threshold time is a dynamic value determined by subtracting a predetermined amount of a time period (e.g., 5 minutes) from a current time. This may allow verification of whether FIFO processing of queued purge instructions has reached a state of the queue where any purge instruction potentially still waiting in the queue to be processed has been added to the queue within the last predetermined amount of time (e.g., narrowing the amount of purge instructions that can remain queued in the queue before the node transitions to a transitional state). In some embodiments, the threshold time is associated with a time when the node began processing queued purge instructions in its queue after becoming unavailable. For example, the threshold time is set as the time when the first purge instruction was requested from the queue of the node after the node become unavailable.

If at 504 it is determined that the next purge instruction exists in the queue and the time value associated with the next purge instruction is chronologically before the threshold time, at 506, the next purge instruction is provided to the requestor. For example, the next purge instruction is removed from the queue and provided to the node for processing and completion. Once a notification is provided that provided a purge instruction has been successfully completed by the node, the process returns to 502.

If at 504 it is determined that the next purge instruction does not exist in the queue or the time value associated with the next purge instruction is chronologically not before the threshold time, at 508, an availability state of the node is indicated as transitional and a current time value is stored as a reference time value. For example, a stored availability status indicator of the node is updated as "ready-to-become online." In some embodiments, indicating the status includes modifying a data structure of a content distribution manager that tracks availability state of content distribution nodes of a content distribution network. For example, a data structure entry corresponding to the availability state of the node is updated to indicate that the node is in the transitional state. When a node is in the transitional state, the node may be unavailable to serve/distribute requested content as a part of a content distribution network, but unlike the unavailable state, adding a purge instruction of a purge request in its queue without having the transitional state node process and complete the purge instruction does not allow a confirmation to be provided that the purge request has been processed (e.g., as compared to an unavailable state node where adding the purge instruction to its queue would be sufficient). The state entry indicated in 508 may be used in 306 of FIG. 3 to at least in part determine whether the node is in a transitional state. Determining the reference time may include determining a current time when the node is placed in the transitional state and recording the current time as the reference time.

At 510, any remaining purge instructions in the queue of the node with a time value chronologically before the reference time is provided for processing in chronological order. For example, the node requests a next purge instruction from its queue and the next purge instruction is provided (e.g., in FIFO order of the queue) for processing by the node. The node indicates when it has successfully processed the purge instruction. The applicable purge instructions are provided in order until there does not exist any remaining purge instruction in the queue that has a time value (e.g., timestamp of when the instruction was added to the queue) before the reference time. Thus the transitional state may allow a node to process queued purge instructions while not requiring additional purge instructions added to its queue while the node is in the transitional state to be completed before the node switches its availability state to become available.

At 512, an availability state of the node is indicated as available. For example, a stored status indicator of the node is updated as "online" In some embodiments, indicating the state includes modifying a data structure of a content distribution manager that tracks availability states of nodes of a content distribution network. For example, a data structure entry corresponding to the node is updated to indicate that the node is available. The state entry indicated in 512 may be used in 304 of FIG. 3 to at least in part determine whether the node is available.

Figure 6:
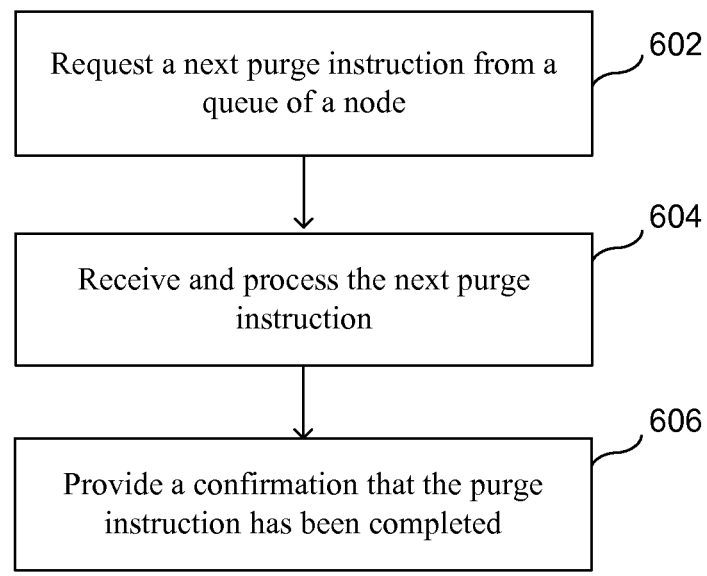
FIG. 6 is a flowchart illustrating an embodiment of a process for processing a purge instruction.

FIG. 6 is a flowchart illustrating an embodiment of a process for processing a purge instruction. The process of FIG. 6 may be at least in part implemented on one or more of nodes 112, 114, and 116 of FIG. 1. In some embodiments, the process of FIG. 6 may be performed continually while a node is not unavailable.

At 602, a next purge instruction is requested from a queue of a node. In some embodiments, the next purge instruction from the queue is the purge instruction added to the queue in 204 of FIG. 2. In some embodiments, the request of 602 is received in 502 or 510 of FIG. 5. In the event the next purge instruction does not exist (e.g., queue is empty), the process may end and the process may be repeated (e.g., periodically).

At 604, the next purge instruction is received and processed. In some embodiments, processing the purge instruction includes clearing an indicated content of the purge instruction from a storage/cache of the node. For example, a cache of the node is cleared of a content referenced by a location address specified in the purge instruction. In some embodiments, processing the purge instruction includes replacing/refreshing an indicated content of the purge instruction in a storage of the node. For example, a cache of the node is of an indicated content and/or reloaded with a content referenced by a location address specified in the purge instruction.

At 606, a confirmation is provided that the purge instruction has been completed. For example, the confirmation is provided to a content distribution manager (e.g., manager 106 of FIG. 1) to allow the content distribution manager to track completion of the purge instruction, an availability status of the node, and/or when a next purge instruction should be provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a purge request, comprising:
an interface configured to receive the purge request;
a storage configured to store an availability state for each content distribution node in a group of content distribution nodes; and
a processor configured to:
generate, based on the purge request, one or more purge instructions for one or more available state content distribution nodes of the group;
queue, based on the purge request, one or more queued purge instructions for one or more unavailable state content distribution nodes of the group;
determine that the one or more available state content distribution nodes of the group have completed processing the one or more purge instructions generated for the one or more available state content distribution nodes; and
authorize, based at least in part on the queuing of the one or more queued purge instructions for the one or more unavailable state nodes, an indication that the purge request has been completed.

2. The system of claim 1, wherein the purge request indicates content to be removed from local cache storages of the group of content distribution nodes.

3. The system of claim 1, wherein the purge request indicates content to be replaced from local cache storages of the group of content distribution nodes.

4. The system of claim 1, wherein the indication is authorized before the one or more unavailable state nodes completes processing of the one or more queued instructions.

5. The system of claim 1, wherein the group of content distribution nodes is included in a content distribution network that mirrors content across the content distribution nodes and distributes the mirrored content.

6. The system of claim 1, wherein the group of content distribution nodes is included in a content delivery network.

7. The system of claim 1, wherein the request is received from a content provider of content indicated to be purged in the purge request.

8. The system of claim 1, wherein the one or more available state content distribution nodes are online and available to distribute content to a requestor of the content.

9. The system of claim 1, wherein the one or more unavailable state content distribution nodes are not available to distribute content to a requestor of the content.

10. The system of claim 1, wherein generating the one or more purge instructions for the one or more available state content distribution nodes includes adding the one or more generated purge instructions to purge instruction queues of the one or more available state content distribution nodes.

11. The system of claim 1, wherein the storage is further configured to store for each content distribution node of the group, a purge instruction status for the received purge request.

12. The system of claim 1, wherein the storage is a memory.

13. The system of claim 1, wherein the indication was authorized based on a verification that the one or more queued purge instructions were queued for the one or more unavailable state nodes and the determination that the one or more available state content distribution nodes of the group have completed processing the one or more purge instructions generated for the one or more available state content distribution nodes.

14. The system of claim 1, wherein the indication was authorized based at least in part on a verification that one or more transitional state content distribution nodes of the group have completed processing one or more purge instructions generated based on the purge request.

15. The system of claim 14, wherein the processor is further configured to determine that a specific one of the one or more unavailable state content distribution nodes has requested a next content purge instruction from its purge instruction queue and a time value associated with the next purge instruction is chronologically after a threshold time, and transition the specific one unavailable state content distribution node to become a transitional state content distribution node.

16. The system of claim 15, wherein the threshold time is a dynamic value determined by subtracting a predetermined amount of time period from a current time.

17. The system of claim 15, wherein the processor is further configured to determine that the transitional state content distribution node does not have left processing a purge instruction that was queued before the transitional state content distribution node was transitioned as the transitional state content distribution node, and transition the transitional state content distribution node to become an available state content distribution node.

18. The system of claim 1, wherein authorizing the indication includes providing the indication to a sender of the purge request that the purge request has been completed.

19. A method for processing a purge request, comprising:
receiving the purge request;
tracking an availability state for each content distribution node in a group of content distribution nodes;
generating, based on the purge request, one or more purge instructions for one or more available state content distribution nodes of the group;
queuing, based on the purge request, one or more queued purge instructions for one or more unavailable state content distribution nodes of the group;
determining that the one or more available state content distribution nodes of the group have completed processing the one or more purge instructions generated for the one or more available state content distribution nodes; and
using a processor to authorize, based at least in part on the queuing of the one or more queued purge instructions for the one or more unavailable state nodes, an indication that the purge request has been completed.

20. The method of claim 19, wherein the purge request indicates content to be removed from local cache storages of the group of content distribution nodes.

21. The method of claim 19, wherein the purge request indicates content to be replaced from local cache storages of the group of content distribution nodes.

22. The method of claim 19, wherein the indication is authorized before the one or more unavailable state nodes completes processing of the one or more queued instructions.

23. The method of claim 19, wherein the group of content distribution nodes is included in a content distribution network that mirrors content across the content distribution nodes and distributes the mirrored content.

24. The method of claim 19, wherein the group of content distribution nodes is included in a content delivery network.

25. The method of claim 19, wherein the request is received from a content provider of content indicated to be purged in the purge request.

26. The method of claim 19, wherein the one or more available state content distribution nodes are online and available to distribute content to a requestor of the content.

27. The method of claim 19, wherein the one or more unavailable state content distribution nodes are not available to distribute content to a requestor of the content.

28. The method of claim 19, wherein generating the one or more purge instructions for the one or more available state content distribution nodes includes adding the one or more generated purge instructions to purge instruction queues of the one or more available state content distribution nodes.

29. The method of claim 19, wherein tracking the availability state for each content distribution node includes tracking for each content distribution node of the group, a purge instruction status for the received purge request.

30. The method of claim 19, wherein the availability state for each content distribution node is stored in a memory.

31. The method of claim 19, wherein the indication was authorized based on a verification that the one or more queued purge instructions were queued for the one or more unavailable state nodes and the determination that the one or more available state content distribution nodes of the group have completed processing the one or more purge instructions generated for the one or more available state content distribution nodes.

32. The method of claim 19, wherein the indication was authorized based at least in part on a verification that one or more transitional state content distribution nodes of the group have completed processing one or more purge instructions generated based on the purge request.

33. The method of claim 32, further comprising determining that a specific one of the one or more unavailable state content distribution nodes has requested a next content purge instruction from its purge instruction queue and a time value associated with the next purge instruction is chronologically after a threshold time, and transitioning the specific one unavailable state content distribution node to become a transitional state content distribution node.

34. The method of claim 33, wherein the threshold time is a dynamic value determined by subtracting a predetermined amount of time period from a current time.

35. The method of claim 33, further comprising determining that the transitional state content distribution node does not have left processing a purge instruction that was queued before the transitional state content distribution node was transitioned as the transitional state content distribution node, and transitioning the transitional state content distribution node to become an available state content distribution node.

36. The method of claim 19, wherein authorizing the indication includes providing the indication to a sender of the purge request that the purge request has been completed.

37. A computer program product for processing a purge request, the computer program product being embodied in a tangible non-transitory computer readable storage medium and comprising computer instructions for:

receiving the purge request;
tracking an availability state for each content distribution node in a group of content distribution nodes;
generating, based on the purge request, one or more purge instructions for one or more available state content distribution nodes of the group;
queuing, based on the purge request, one or more queued purge instructions for one or more unavailable state content distribution nodes of the group;
determining that the one or more available state content distribution nodes of the group have completed processing the one or more purge instructions generated for the one or more available state content distribution nodes; and
authorizing, based at least in part on the queuing of the one or more queued purge instructions for the one or more unavailable state nodes, an indication that the purge request has been completed.

38. The computer program product of claim 37, wherein generating the one or more purge instructions for the one or more available state content distribution nodes includes adding the one or more generated purge instructions to purge instruction queues of the one or more available state content distribution nodes.

39. The computer program product of claim 37, wherein the indication was authorized based on a verification that the one or more queued purge instructions were queued for the one or more unavailable state nodes and the determination that the one or more available state content distribution nodes of the group have completed processing the one or more purge instructions generated for the one or more available state content distribution nodes.

40. The computer program product of claim 37, wherein the indication was authorized based at least in part on a verification that one or more transitional state content distribution nodes of the group have completed processing one or more purge instructions generated based on the purge request.

* * * * *